United States Patent
Crasta et al.

(10) Patent No.: US 9,954,815 B2
(45) Date of Patent: Apr. 24, 2018

(54) DOMAIN NAME COLLABORATION SERVICE USING DOMAIN NAME DEPENDENCY SERVER

(71) Applicant: Freescale Semiconductor, Inc., Austin, TX (US)

(72) Inventors: Denis A. Crasta, San Jose, CA (US); Srinivasa R. Addepalli, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 149 days.

(21) Appl. No.: 14/486,584

(22) Filed: Sep. 15, 2014

(65) Prior Publication Data

US 2016/0080262 A1 Mar. 17, 2016

(51) Int. Cl.
*H04L 29/12* (2006.01)

(52) U.S. Cl.
CPC ...... *H04L 61/1511* (2013.01); *H04L 61/1552* (2013.01); *H04L 61/6009* (2013.01)

(58) Field of Classification Search
CPC .................. H04L 61/1511; H04L 61/6009
See application file for complete search history.

(56) References Cited

U.S. PATENT DOCUMENTS

| | | | |
|---|---|---|---|
| 7,152,118 B2 | 12/2006 | Anderson, IV et al. | |
| 7,343,397 B2 | 3/2008 | Kochanski | |
| 8,533,282 B2 | 9/2013 | Anderson, IV et al. | |
| 8,862,726 B1* | 10/2014 | Song | H04L 67/22 709/224 |
| 8,903,899 B1* | 12/2014 | Badros | H04L 61/1511 709/203 |
| 9,294,435 B2* | 3/2016 | Ivanov | H04L 61/1511 |
| 9,654,439 B2* | 5/2017 | Chan | H04L 41/046 |
| 2002/0010798 A1* | 1/2002 | Ben-Shaul | G06F 17/3089 709/247 |
| 2002/0178238 A1* | 11/2002 | Fletcher | H04L 29/12009 709/220 |
| 2003/0163722 A1* | 8/2003 | Anderson, IV | H04L 29/12216 726/3 |
| 2003/0172183 A1* | 9/2003 | Anderson, IV | H04L 29/12216 709/245 |
| 2003/0187746 A1* | 10/2003 | Kochanski | G06Q 30/06 709/218 |

(Continued)

FOREIGN PATENT DOCUMENTS

EP 2339816 6/2011

OTHER PUBLICATIONS

Shang, Hao et al., "Piggybacking Related Domain Names to Improve DNS Performance", Computer Networks: The International Journal of Computer and Telecommunications Networking, vol. 50 Issue 11, Aug. 10, 2006, 28 pages.

*Primary Examiner* — Jimmy H Tran

(57) ABSTRACT

A domain name dependency server (DDS) stores known relationships between domain names. In response to a domain relationship query from a local DNS server for a given domain name, the DDS supplies the domain names that are related to the given domain name. This reduces or eliminates serial requests for the related domain names from the local DNS server, reducing overall DNS lookup latency for the requested service. The DDS can be shared among multiple local DNS servers, and can be updated dynamically or manually to enhance the accuracy of its stored domain name relationships.

9 Claims, 7 Drawing Sheets

(56) References Cited

U.S. PATENT DOCUMENTS

| | | | |
|---|---|---|---|
| 2004/0049509 A1* | 3/2004 | Keller | G06F 11/008 |
| 2004/0073707 A1* | 4/2004 | Dillon | H04L 29/12009 |
| | | | 709/245 |
| 2004/0215823 A1* | 10/2004 | Kleinfelter | H04L 29/12066 |
| | | | 709/245 |
| 2006/0218304 A1* | 9/2006 | Mukherjee | G06F 17/30902 |
| | | | 709/246 |
| 2006/0294223 A1* | 12/2006 | Glasgow | H04L 67/2847 |
| | | | 709/224 |
| 2007/0156802 A1* | 7/2007 | Ruetsch | G06F 7/49989 |
| | | | 708/490 |
| 2008/0201487 A1* | 8/2008 | Blinn | H04L 29/12066 |
| | | | 709/245 |
| 2009/0063704 A1* | 3/2009 | Taylor | H04L 29/12066 |
| | | | 709/245 |
| 2009/0204696 A1* | 8/2009 | Zhang | H04L 69/16 |
| | | | 709/223 |
| 2009/0282038 A1* | 11/2009 | Subotin | G06F 17/30705 |
| 2010/0034218 A1* | 2/2010 | Kovvali | H04L 69/32 |
| | | | 370/473 |
| 2010/0049872 A1* | 2/2010 | Roskind | G06F 17/30902 |
| | | | 709/245 |
| 2010/0274970 A1* | 10/2010 | Treuhaft | H04L 29/12066 |
| | | | 711/118 |
| 2011/0029599 A1* | 2/2011 | Pulleyn | H04L 29/12066 |
| | | | 709/203 |
| 2011/0145316 A1* | 6/2011 | Ait-Ameur | H04L 29/12066 |
| | | | 709/203 |
| 2011/0153867 A1* | 6/2011 | van de Ven | H04L 29/12811 |
| | | | 709/245 |
| 2011/0276603 A1* | 11/2011 | Bojanic | G06F 17/30306 |
| | | | 707/797 |
| 2011/0280247 A1* | 11/2011 | Roskind | H04L 69/163 |
| | | | 370/401 |
| 2011/0320524 A1* | 12/2011 | Nandagopal | H04L 29/12066 |
| | | | 709/203 |
| 2012/0110148 A1* | 5/2012 | Liu | H04L 29/12066 |
| | | | 709/220 |
| 2012/0131639 A1* | 5/2012 | Alex | H04L 63/0892 |
| | | | 726/3 |
| 2013/0006799 A1* | 1/2013 | Shuster | H04L 29/12066 |
| | | | 705/26.3 |
| 2014/0181268 A1* | 6/2014 | Stevens | H04L 67/2804 |
| | | | 709/219 |
| 2015/0195243 A1* | 7/2015 | Roskind | H04L 61/1511 |
| | | | 709/213 |
| 2015/0215267 A1* | 7/2015 | Kagan | H04L 61/1511 |
| | | | 709/245 |
| 2015/0237001 A1* | 8/2015 | Ivanov | H04L 61/2007 |
| | | | 709/245 |

* cited by examiner

DOMAIN NAME COLLABORATION SERVICE USING DOMAIN NAME DEPENDENCY SERVER

BACKGROUND

Field of the Disclosure

The present disclosure relates generally to computer networks and more particularly to resolution of domain names for computer networks.

Description of the Related Art

To facilitate public usage, the Internet employs two sets of identifiers: Internet Protocol (IP) addresses that identify the location of computer services and devices in the Internet, and domain names that identify an area of the Internet under a particular entity's administrative authority or control. Domain names are administered under the Domain Name System (DNS), which provides an infrastructure for translation of domain names to IP addresses. The DNS is maintained by a database distributed over a set of authoritative name servers (also referred to as authoritative DNS servers), wherein each authoritative DNS server stores a mapping of a subset of domain names to a subset of IP addresses. Designated name servers, referred to as root DNS servers, maintain lists of authoritative DNS servers and their corresponding subset of domain name mappings. To identify an IP address for a particular domain name (a process referred to herein as "DNS lookups"), a client can query a local DNS server, which in turn can query one or more root servers to identify one or more authoritative DNS servers that store the mapping for the domain name, and can query the authoritative DNS servers to retrieve the IP address. To speed up DNS lookups, recently resolved domain names and their corresponding IP addresses can be cached at one or both of the client device and one or more local DNS servers located in the client's internal network.

In some cases, access to a particular Internet service (e.g., a web page, streaming media, messaging, and the like) can trigger multiple DNS lookups. For example, a particular web page may include multiple resources having different domain names, such that client's request to access the web page triggers a DNS lookup for each of the different domain names. In the aggregate, the multiple DNS lookups can require a relatively long amount of time to complete. Such delays can be a detriment to the user experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
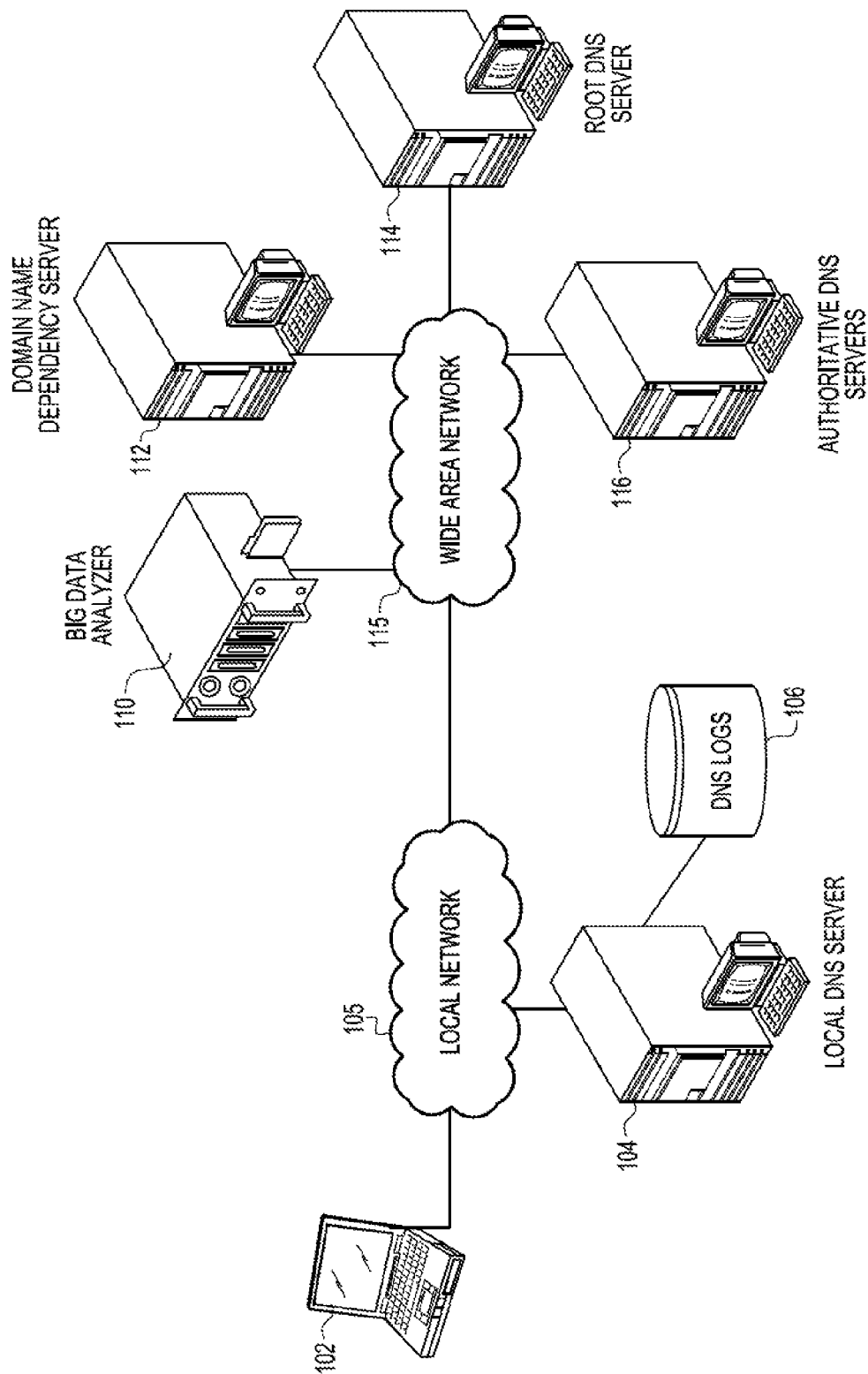
FIG. 1 is a block diagram of a communication system for DNS lookups in accordance with at least one embodiment of the present disclosure.

FIGS. 1-8 illustrate techniques for reducing latency from DNS lookups by employing a domain name dependency server (DDS) to store known relationships between domain names. In response to a domain relationship query from a local DNS server for a given domain name, the DDS supplies the domain name that are related to the given domain name. This reduces or eliminates serial requests for the related domain names from the local DNS server, reducing overall DNS lookup latency for the requested service. The DDS can be shared among multiple local DNS servers, and can be updated dynamically or manually to enhance the accuracy of its stored domain name relationships.

To illustrate operation of the DDS via an example, in order to access a web page a client generates a DNS query for a domain name, referred to for purposes of description as the "base domain name". However, the web page includes content accessible only through other domain names, referred to as "dependent domain names". Conventionally, the client would receive a portion of the web page associated with the base domain name, identify that there is additional content from a dependent domain name, and generate another DNS query for the dependent domain name. This DNS query may trigger web page access to web page content associated with another dependent domain name, triggering another DNS query, and so on until all of the content for the web page has been retrieved. Thus, conventionally the DNS queries for the dependent domain names are generated serially, increasing latency. In contrast to this conventional approach, under the techniques disclosed herein the DDS query for the base domain name is provided to the DDS. In response the DDS identifies many or all of the dependent domain names for the domain name, and provides these dependent domain names to the client. The DDS thus reduces or eliminates serial DNS queries for dependent domain names, or reduces the amount of time it takes to satisfy the serial requests by providing the information to satisfy the requests to a local DNS server for the requesting device. Further, the DDS can be a separate service from and operate independently of the root DNS servers and authoritative DNS servers. This allows the DDS to reduce DNS lookup latency without requiring modifications to existing DNS infrastructure.

In some embodiments, the local DNS server can assist in establishing the domain name relationships stored at the DDS. In particular, the local DNS server can analyze DNS queries received from its connected clients to identify potential dependencies between domain names. To enhance the accuracy of its analysis, the local DNS server can utilize the client identifier with each DNS query, so that potential dependencies can be more easily detected. Further, the local DNS server can instruct the clients to provide all DNS queries to the local DNS server, rather than attempting to satisfy a DNS query at a local cache. This ensures that the local DNS server receives more complete information from which to identify domain name relationships.

FIG. 1 illustrates a communication system 100 for providing computer-network based services to a client device 102 in accordance with at least one embodiment. The client device 102 can be a personal computer, workstation, tablet, game console, compute-enabled mobile device (e.g., a smartphone), or any other device that is generally configured to execute software to make computer-network based services accessible to a user. For purposes of description of FIG. 1, it is assumed that the computer-based service is provision of one or more web pages, but it will be appreciated that computer-network based services includes other services such as streaming of media (e.g., audio or video streaming), network messaging (e.g., chat services, text message services), and the like.

To facilitate provision of a web page to the client device 102, the communication system 100 includes a local DNS server 104, a local network 105, a wide area network 115, DNS logs 106, a data analyzer 110, a DDS 112, a root DNS server 114, and authoritative DNS servers 116. The local network 105 is a set of one or more devices (e.g., routers, servers, switches) and associated infrastructure (e.g. network cabling) to provide for network communications for a single entity, such as a household, office, business or industrial facility, and the like. The wide area network 115 is a set of devices and associated infrastructure to provide for network communications for multiple entities over a wide area network. In at least one embodiment, the wide area network 115 is the Internet, or a portion thereof.

The local DNS server 104 provides DNS lookup services for devices (referred to as "local devices"), including the client device 102, that are connected to the local network 105. To provide such services, the local DNS server 104 maintains a cache (referred to as an "LDNS cache") of recently received DNS queries, wherein each entry of the LDNS cache includes a domain name and corresponding IP address. In response to receiving a DNS query from a local device via the local network 105, the local DNS server 104 determines whether the LDNS cache stores the domain name indicated by the received DNS query. If so, the local DNS server 104 satisfies the DNS query from the LDNS cache by providing the IP address for the domain name to the requesting local device. If the received DNS query is not located at the LDNS cache, the local DNS server 104 obtains the IP address for the domain name, as described further herein, by recursively providing the DNS query to the root DNS server 114 and authoritative DNS servers 116 according to the conventional DNS protocol. The local DNS server 104 stores the obtained IP address with the domain name at the LDNS cache for the duration of corresponding TTL (time-to-live) in the response and also provides the IP address to the requesting local device, thereby satisfying the DNS query.

The root DNS server 114 and authoritative DNS server 116 are conventional root and authoritative DNS servers, respectively, and are generally configured to satisfy DNS queries according to conventional DNS protocol. It will be appreciated that although the root DNS server 114 and authoritative DNS server 116 are illustrated as single servers, in some embodiments each represents multiple servers of a similar type. Thus, for example, a DNS query can be recursively satisfied at multiple root DNS servers and authoritative DNS servers according to conventional DNS protocol.

The DDS 112 maintains a database of domain names that indicates relationships (e.g., dependencies) between domain names. In response to receiving a DNS query for a given domain name, the DDS 112 uses the database to identify the domain names related to the given domain name, and provides the identified domain names, in response to the query. In at least one embodiment, the database of the DDS 112 can be updated according to a defined collaboration service protocol as service content on the Internet changes. Thus, for example, when a webmaster changes the content of a web page and makes corresponding changes in the domain name relationships for the web page, the webmaster can use the collaboration service protocol to update the database of the DDS 112 to reflect the new relationships.

In at least one embodiment, the DDS 112 can also be updated based on analysis of DNS query traffic over the wide area network 115. This analysis is facilitated by the DNS logs 106 and the data analyzer 110. The DNS logs 106 store DNS queries communicated over the wide area network 115 during a specified amount of time, together with other information about the queries, such as the local DNS server that provided each query, the time the query was provided, and the like. The data analyzer 110 periodically analyzes the DNS logs 106, using conventional data mining techniques, to identify relationships between domain names. For example, the data analyzer 110 may identify that two domain names are related by determining that the two domain names are frequently requested by the same local DNS server in close proximity in time. The data analyzer 110 periodically updates the database of the DDS 112 based on the identified relationships. Accordingly, the database of domain name relationships of the DDS 112 is based on DNS queries from multiple clients, multiple local DNS servers, and multiple local networks. Because the database is based on this wide cross-section of data, its accuracy and reliability is enhanced relative to a database based only on DNS queries at a single, or relatively few, local DNS servers.

In operation, the client device 102 receives a request from a user to access a web page or other service associated with a base domain name. In response, a DNS stub resolver at the client device 102 receives a DNS query for the base domain name. In at least one embodiment, the DNS stub resolver first attempts to resolve the DNS query at a local cache of the client device 102 that stores the domain names and corresponding IP addresses for DNS queries recently generated at the client device 102. If the local cache cannot satisfy the DNS query, the stub resolver communicates the DNS query to the local DNS server 104.

In response to receiving the DNS query, the local DNS server 104 identifies whether the query can be satisfied at the LDNS cache. If so, it satisfies the DNS query by retrieving the IP address for the domain name indicated by the DNS query and providing the IP address to the stub resolver at the client 102. If the LDNS cache does not include the domain name for the DNS query, the local DNS server 104 recursively forwards the DNS query to the root DNS server 114 and the authoritative DNS server 116 for satisfaction. Once it receives the IP address for the domain name, the local DNS server 104 stores the domain name and IP address at the LDNS cache and forwards the IP address to the stub resolver to satisfy the DNS query.

In addition, the local DNS server 104 periodically forwards each received DNS query (including those it can satisfy at the LDNS cache) to the DDS 112. In response, the DDS 112 uses its database to identify domain names that are related to the domain name of the DNS query and provides those domain names to the local DNS server 104. In at least one other embodiment, the DDS 112 provides the related domain names without IP addresses. In response, the local DNS server 104 determines whether IP addresses for the related domain names are stored at the LDNS cache. For the related domain names that do not have IP addresses stored at the LDNS cache, the local DNS server 104 recursively provides DNS queries to the root DNS server 114 and the authoritative DNS servers 116. The local DNS server 104 thus identifies IP addresses for all of the dependent domain names.

In at least one embodiment, the local DNS server 104 stores the dependent domain names and their IP addresses at the LDNS cache, with the expectation that the stub resolver at the client device 102 will shortly provide DNS queries for at least some of the dependent domain names. Thus, the local DNS server 104, together with the DDS 112, moves the dependent domain names and corresponding IP addresses relatively closer to the client device 102, shortening the DNS lookup latency for the web page or other service. In at least one embodiment, the local DNS server 104 provides ("piggybacks") the related domain names and their associated IP addresses to the client device 102 with the response to the DNS query of the base domain name. Accordingly all of the dependent domain names and corresponding IP addresses are available at the cache of the client device 102, further reducing DNS lookup latency, and the potential cost of using a large amount of cache space.

Figure 2:
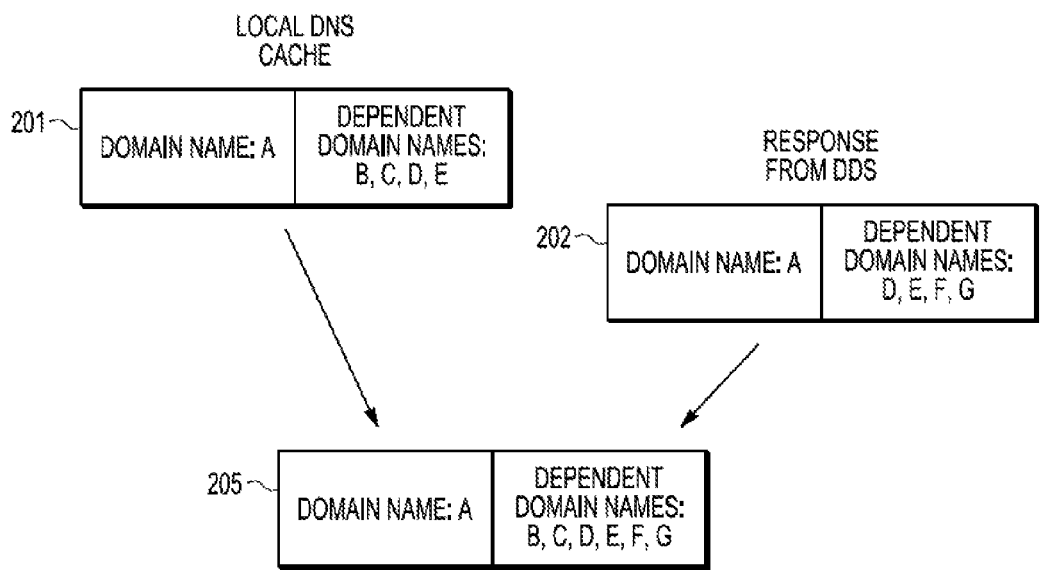
FIG. 2 is a diagram illustrating identification of dependent domain names at a local DNS server of the communication system of FIG. 1 in accordance with at least one embodiment of the present disclosure.

In at least one embodiment, the local DNS server 104 maintains its own local database of domain name relationships and uses the local database, together with responses from the DDS 112, to determine an overall set of domain name relationships in response to a DNS query. An example is illustrated at FIG. 2, which depicts an entry 201 of the domain name database at the local DNS server 104 and an entry 202 of the database of the DDS 112. Both the entry 201 and the entry 202 indicate domain name relationships for the same domain name, designated "A" in the depicted example. Entry 201 indicates that domain names B, C, D, and E are dependent on domain name A. Entry 202 indicates that domain names D, E, F, and G are dependent on domain name A.

In response to receiving a DNS query for domain name A from the DNS resolver stub at the client device 102, the local DNS server 104 consults its own database of domain name relationships and identifies entry 201 as the corresponding entry. In addition, the local DNS server 104 provides the DNS query for domain A to the DDS 112, which in response provides the information of entry 202 to the local DNS server 104. The local DNS server 104 merges the entries 201 and 202 to determine the set 205 of dependencies for domain A. Thus, in the illustrated example set 205 indicates that domain names B, C, D, E, F, and G are dependent on domain name A. In response to identifying set 205, the local DNS server 104 generates DNS queries for those dependent domain names not stored at the LDNS cache, and provides the DNS recursively queries to the root DNS server 114 and the authoritative DNS server 116 for satisfaction. In addition, the local DNS server 104 can update entry 201 of its database to reflect the merged information of set 205.

Figure 3:
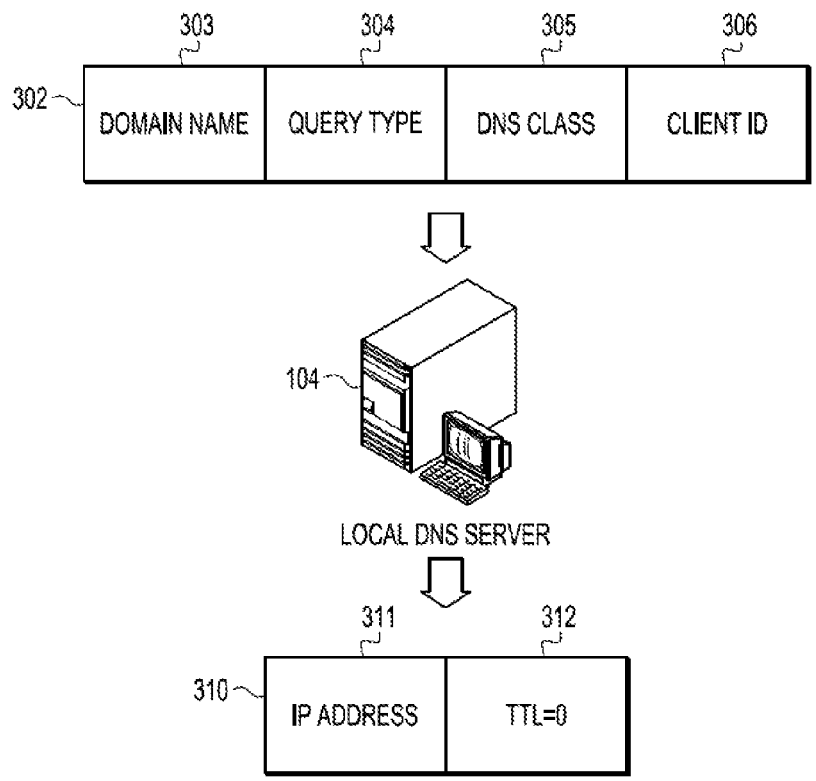
FIG. 3 is a diagram illustrating a response from the local DNS server to a DNS query at the communication system of FIG. 1 in accordance with at least one embodiment of the present disclosure.

To generate, update, and maintain its database of domain name relationships, the local DNS server 104 monitors and analyzes DNS queries received from DNS resolver stubs at local devices of the local network 105. However, at least two factors can make it difficult for the local DNS server 104 to identify correct relationships between domain names. First, because the local DNS server 104 receives DNS queries from many different local devices, it can be difficult for the DNS server 104 to identify which DNS queries represent requests triggered by base domain names. Further, because some DNS requests for dependent domain names could be satisfied at caches of the local devices (and therefore those requests are not provided to the local DNS server 104), it can be difficult for the DNS server 104 to develop a complete list of relationships for a given domain name. Accordingly, in some embodiments the local DNS server 104 can take measures to increase the amount of information it receives to generate, update, and maintain its database of domain name relationships. FIG. 3 illustrates examples of these measures in accordance with at least one embodiment.

FIG. 3 illustrates a DNS query 302 generated by a DNS stub resolver of the client device 102. The DNS query 302 includes a domain name field 303, a query type field 304, a DNS class field 305, and a client ID field 306. The domain name field 303 indicates the domain name for the DNS query 302 (i.e. the domain name for which an IP address is sought). The query type field 304 indicates the type of the DNS query 302 (e.g., a specific resource or special type of query). The DNS class field 305 indicates a class for the domain name (e.g., an Internet class). The client ID field 306 indicates an identifier, such as a network address, for the local device that generated the DNS query 302.

By requiring that the DNS query 302 include the client ID field 306, the local DNS server 104 can more easily identify relationships between domain names. To illustrate, in some scenarios DNS relationships are indicated by the time sequence of DNS queries from an individual local device. For example, a local device that has encountered a set of dependent domain names is likely to generate DNS queries for those domain names over a relatively short period of time. By including the client ID field 306 in all DNS queries, the local DNS server can identify the time sequence of DNS requests from each individual local device, and therefore more easily identify relationships between domain names.

In response to the DNS query 302, the local DNS server 104 generates a DNS response 310 having an IP address field 311 and a time-to-live (TTL) field 312. The IP address field 311 indicates the IP address for the domain name at the domain name field 303. The time-to-live field 312 indicates the amount of time that the client device 102 should keep the domain name and IP address cached at its local DNS cache. In the illustrated example, the TTL field is set to zero, indicating that the domain name and IP address should not be cached. In at least one embodiment, the local DNS server provides a similar indication that the domain name and IP address is not to be cached with each response to a DNS query received from the client device 102, at least for a specified amount of time. This ensures that the client device 102 does not satisfy any DNS queries at its local DNS cache, but instead provides all such queries to the local DNS server 104. The local DNS server 104 therefore receives more complete data from the client device 102 with respect to DNS queries, allowing the local DNS server 104 to develop a more complete local database of domain name relationships.

To illustrate via an example, in one scenario the client device 102 seeks to access a web service at base domain name A, which is related to dependent domain names B, C, D, and E. If the client device 102 is allowed to cache domain names and IP addresses at its local DNS cache, it may be able to satisfy DNS queries for some of the domain names (e.g., for domain names B and D) at the local DNS cache. The client device 102 will therefore not provide these DNS queries to the local DNS server 104, preventing it from identifying the full sequence of related domain names. By preventing caching of domain names and IP addresses at the local DNS cache (e.g., by setting the TTL field of DNS query responses to zero), the local DNS server 104 forces the client device 102 to provide all of the DNS queries for all of the dependent domain names B, C, D, and E to the local DNS server 104 so that all of the dependencies can be detected and stored at the local database.

Figure 4:
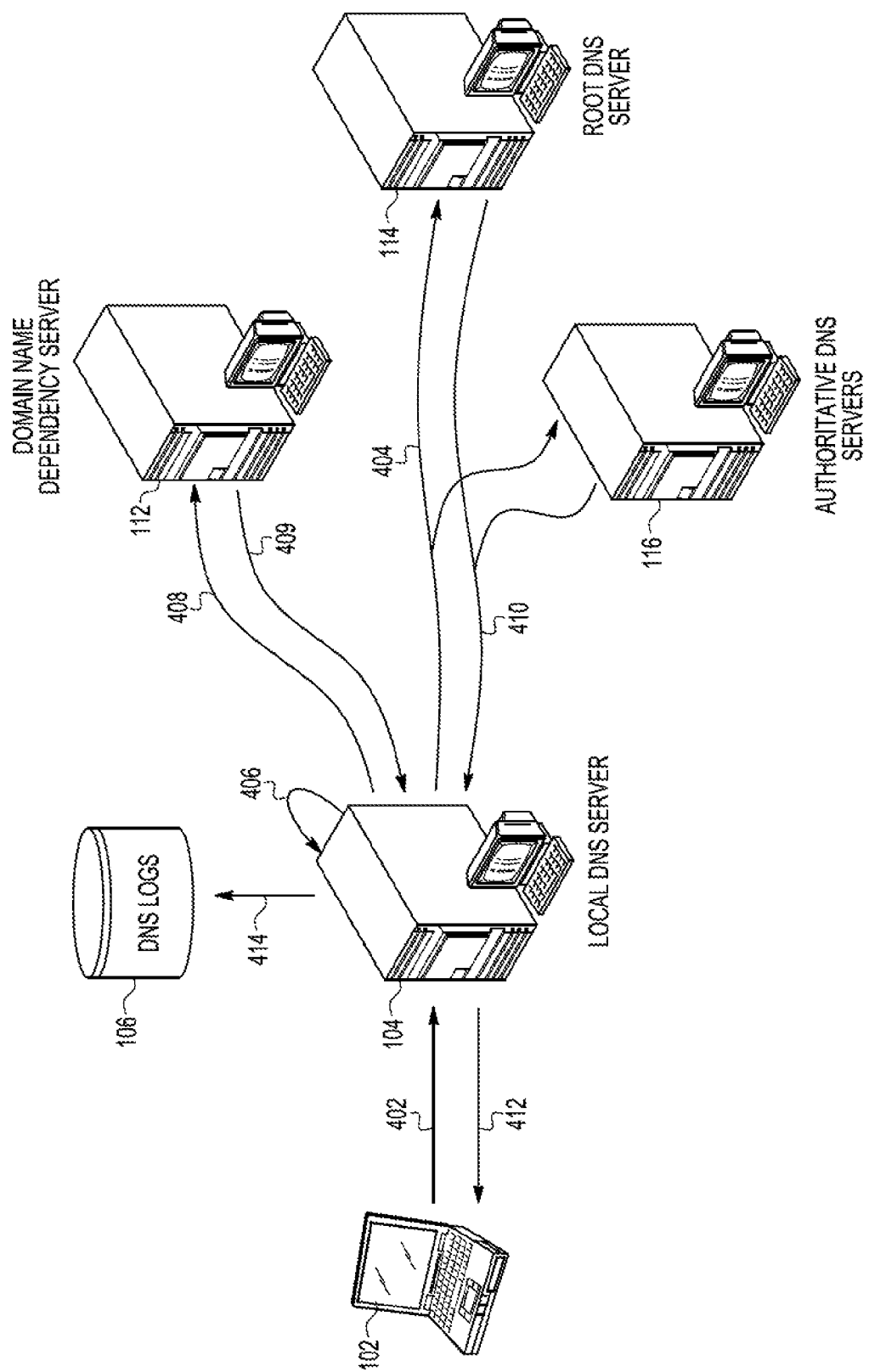
FIG. 4 is a diagram illustrating identification of related domain names at the communication system of FIG. 1 in accordance with at least one embodiment of the present disclosure.

FIG. 4 illustrates an example flow for identifying related domain names at the communication system 100 in accordance with at least one embodiment. At 402, the client device 102 communicates a DNS query for a base domain name to the local DNS server 104. In response, at 404 the local DNS server 104 recursively communicates the DNS query to the root DNS server 114 and the authoritative DNS server 116 for satisfaction. In addition, at 406 the local DNS server 104 updates its local database of domain name relationships based on the client ID and timestamp of the received DNS query. Further, at 408 the local DNS server 104 communicates the DNS query to the DDS 112.

In response to receiving the DNS query, the DDS 112 accesses its database to identify a list domain names related to the base domain name supplied by the DNS query. At 409, the DDS 112 supplies the list of related domain names to the local DNS server 104. In response, the local DNS server 104 uses its local database of domain name relationships to identify its own list of domain names and merges its list with the list received from the DDS 112. For those domain names on the merged list that cannot be satisfied at its local DNS cache, the local DNS server 104 recursively provides DNS queries to the root DNS server 114 and the authoritative DNS server 116 for satisfaction.

At 410 the root DNS server 114 and the authoritative DNS server 116 provide to the local DNS server 104 IP addresses for all of the DNS queries. The local DNS server 104 stores all of the IP addresses at its local DNS cache and at 412 communicates the IP address for the base domain name to the client device 102. In at least one embodiment the local DNS server may piggyback the IP addresses for the related domain names with the IP address for the base domain name, so that all the IP addresses are communicated to the client device 102. In addition, at 414 the DNS logs 106 are updated to reflect all of the DNS queries communicated between the client device 102, the local DNS server 104, the root DNS server 114, and the authoritative DNS server 116. The DNS logs are subsequently analyzed by the data analyzer 110 to update the relationships at the database of the DDS 112. In at least one embodiment, this "big-data" analysis will capture missed relationships that could not be detected by real-time analysis done at the local DNS server 104.

Figure 5:
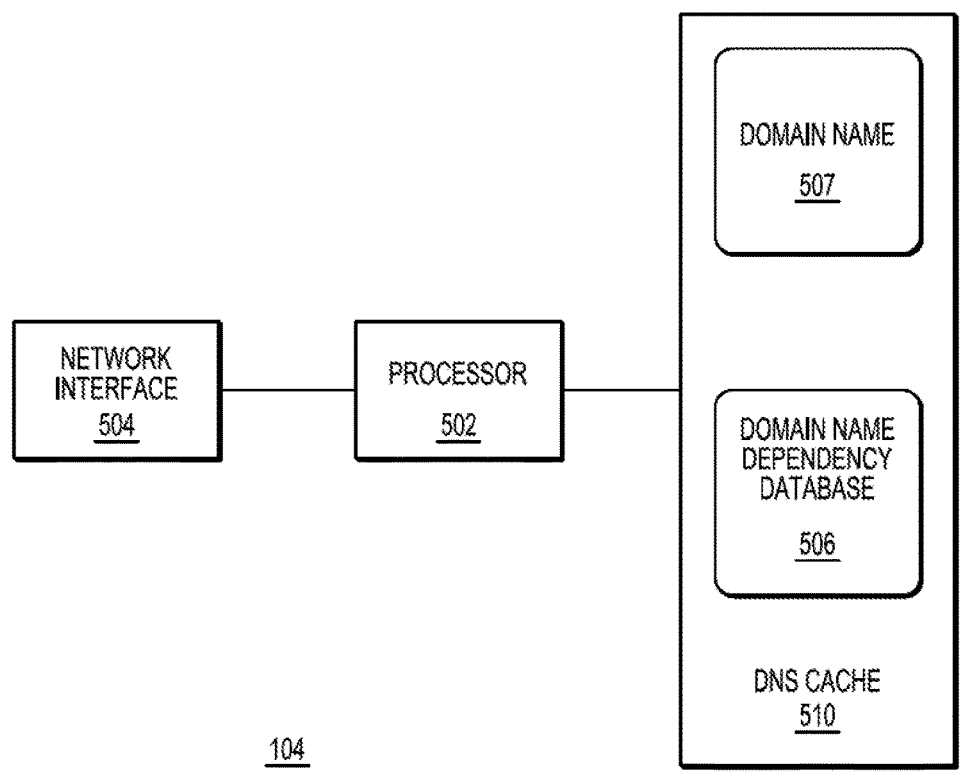
FIG. 5 is a block diagram of a local DNS server of FIG. 1 in accordance with one embodiment of the present disclosure.
Figure 6:
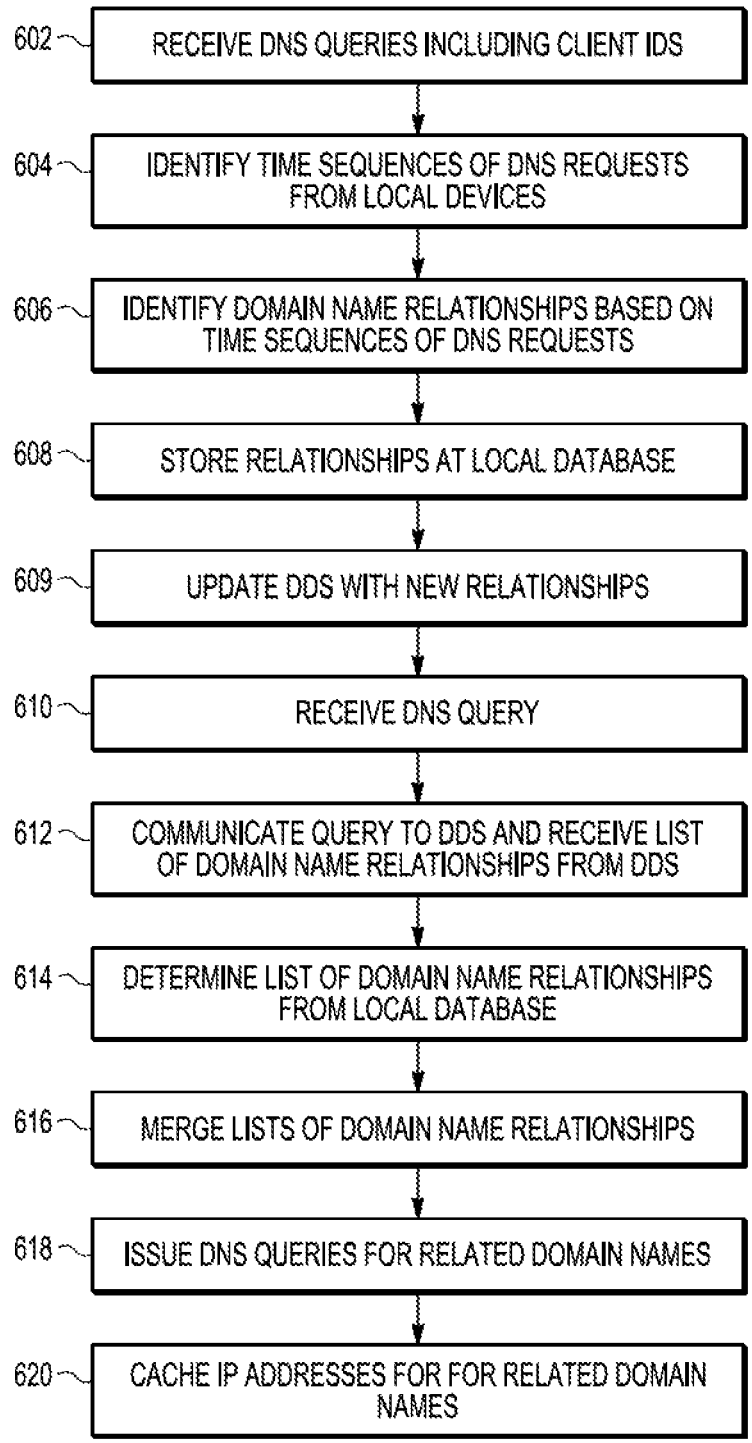
FIG. 6 is a flow diagram of a method of identifying a list of dependent domain names at a local DNS server in accordance with one embodiment of the present disclosure.

FIG. 5 is a block diagram of the local DNS server 104 of FIG. 1 in accordance with at least one embodiment of the present disclosure. The local DNS server 104 includes a processor 502, a network interface 504, a DNS cache 510, and a domain dependency database 506. Operation of the local DNS server 104, as illustrated at FIG. 5, can be better understood with reference to FIG. 6, which illustrates a flow diagram of a method 600 of identifying related domain names at the local DNS server 104.

At block 602, the processor 502 receives, via the network interface 504, DNS queries generated by local devices of the local network 105 (FIG. 1). Each of the DNS queries includes a client identifier to identify the local device that generated the DNS query. At block 604 the processor 502 uses the client identifiers and DNS queries to determine, for each local device, a corresponding time sequence of DNS queries. At block 606 the processor 502 uses the time sequences to identify relationships between domain names. For example, in response to identifying that a threshold number of the time sequences indicate that a DNS query for domain name B follows a request for domain name A, the processor 502 can identify that domain name B is dependent on domain name A. At block 608 the processor 502 stores the identified relationships at the domain dependency database 506. At block 609 local DNS server 104 selectively (e.g., as specified by a system administrator) updates the newly identified relationship to the DDS using DCS (DNS Collaboration Service) API.

At block 610 the processor 502 receives, via the network interface 504, a DNS query from the client device 102 for a base domain name 507. In response, at block 612 the processor 502 periodically communicates the DNS query to the DDS 112 (FIG. 1) via the network interface 504. The DDS 112 provides a list of domain name relationships for the base domain name 507 to the local DNS server 104. At block 614, the processor 502 determines a list of domain name relationships for the base domain name 507 based on the domain name dependency database 506. At block 616 the processor 502 merges the list of domain name relationships received from the DDS 112 with the locally generated list. At block 618 the processor 502 issues recursive DNS queries for the related domain names (or for a subset of those related domain names that do not have IP addresses cached at the DNS cache 510) to the root DNS server 114 and the authoritative DNS server 116. In response, the processor 502 receives, via the network interface 504, IP addresses for all of the related domain names. At block 620 the processor 502 caches the IP addresses at the DNS cache 510.

Figure 7:
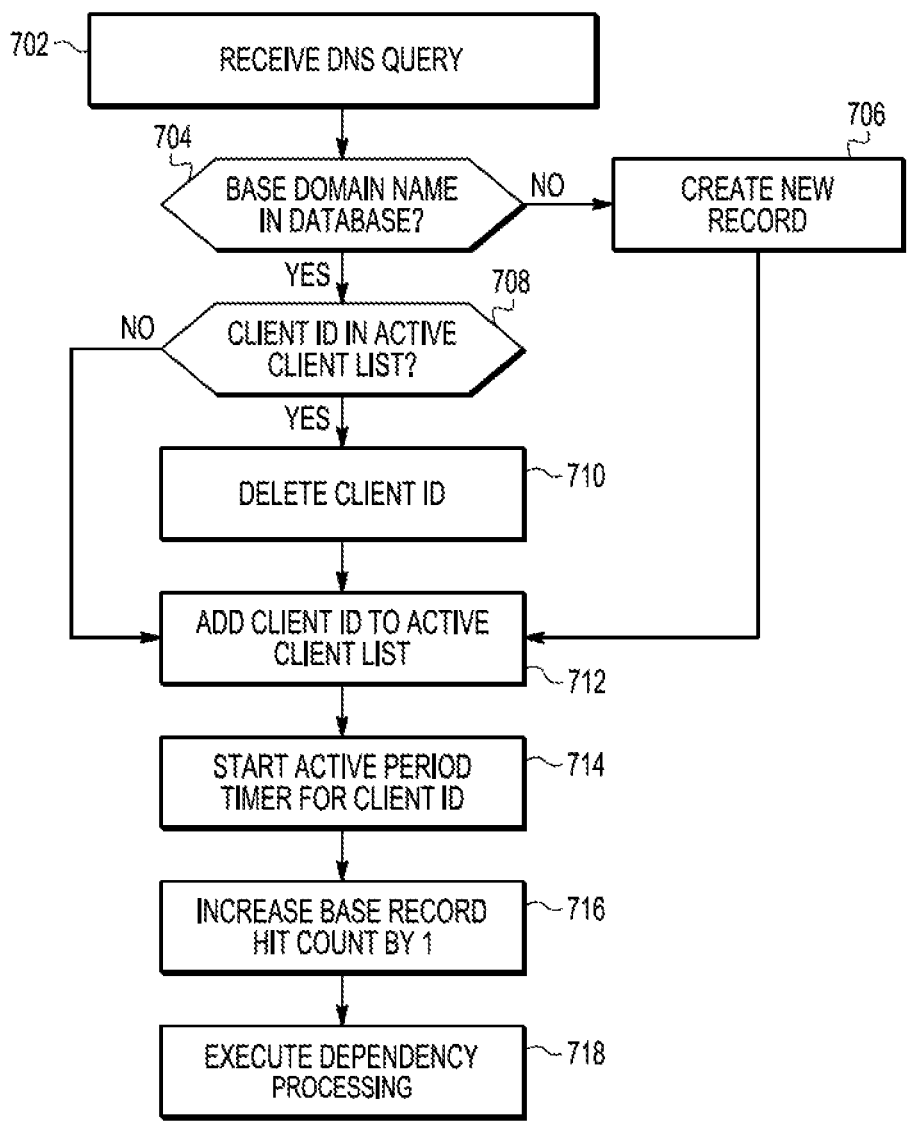
FIG. 7 is a flow diagram of a method of managing a database of dependent domain names at the local DNS server of FIG. 1 in accordance with at least one embodiment of the present disclosure.

FIG. 7 illustrates a flow diagram of a method 700 of identifying domain name dependencies by co-relating pairs of DNS queries made by the same client which are within a configurable time interval. At block 702 the processor 502 receives a DNS query. At block 704 the processor 502 determines whether the base domain name in the DNS query has an entry at the domain name dependency database 506. If not, the method flow moves to block 706 and the processor 502 creates an entry for the base domain name at the domain name dependency database 506. The method flow proceeds to block 712, described below.

Returning to block 704, if the base domain name in the DNS query has an entry at the domain name dependency database 506, the method flow moves to block 708 and processor 502 identifies whether the client identifier in the DNS query is in an active client list (not shown at FIG. 5). If not, the method flow moves to block 712, described below. If the client identifier is in the active client list, the method flow proceeds to block 710 and the processor 502 deletes the client identifier from the active client list to prevent multiple entries in the list for the client identifier.

At block 712, the processor 502 adds the client identifier for the DNS query to the active client list. At block 714 the processor 502 starts an active period timer for the client identifier. At block 716 the processor 502 increments a base record hit count for the record including the base domain name at the domain name dependency database 506. At block 718 the processor 502 executes dependency processing for the received DNS query, as described below with respect to FIG. 8.

Figure 8:
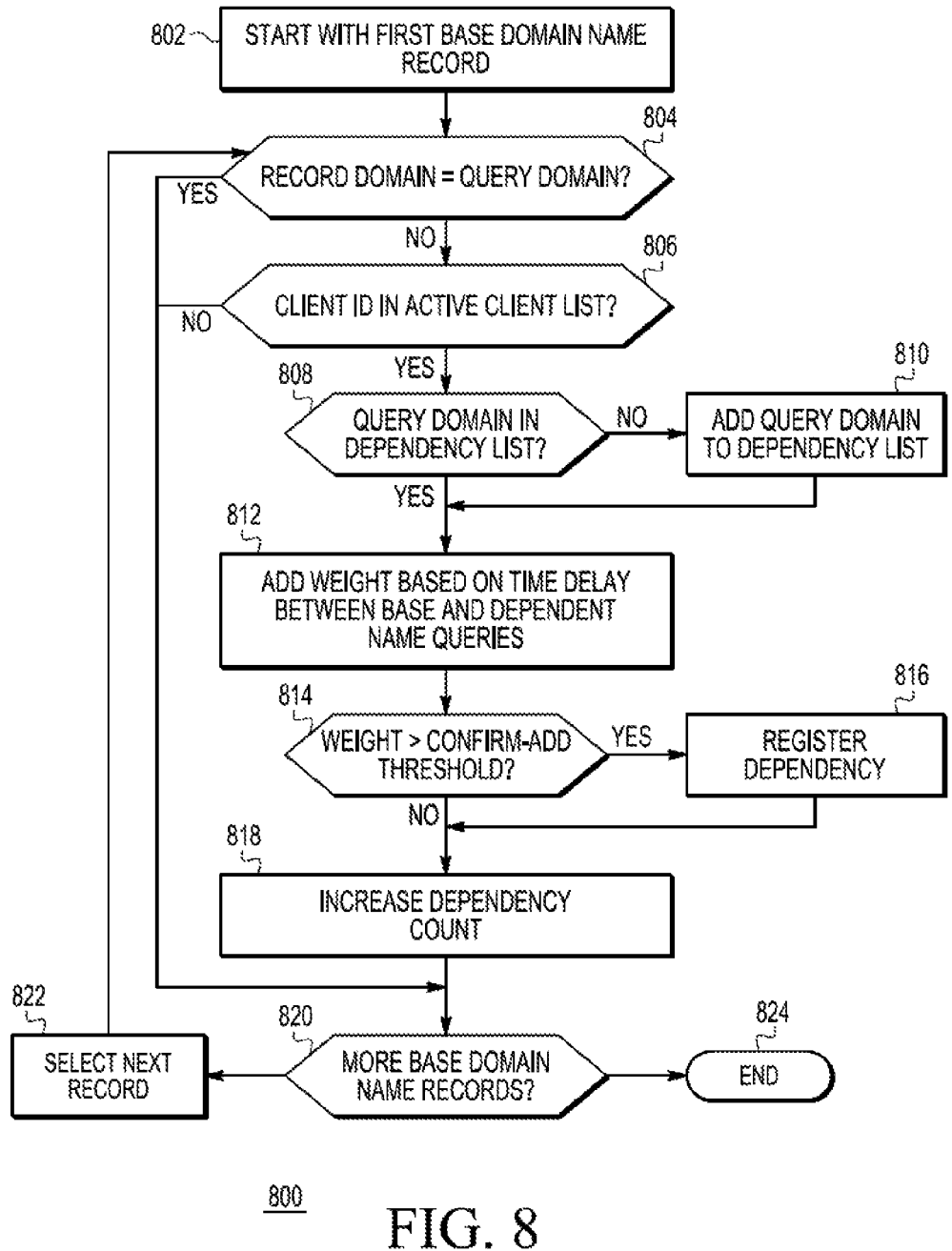
FIG. 8 is a flow diagram of a method of processing a domain name query at the local DNS server of FIG. 1 in accordance with at least one embodiment of the present disclosure.

FIG. 8 illustrates a flow diagram of a method 800 of executing dependency processing for a received DNS query in accordance with one embodiment of the present disclosure. At block 802 the processor 502 selects, at the domain name dependency database 506, an initial record. At block 804 the processor 502 determines whether the base domain name of the DNS query is the same as the base domain name for the selected record. If not, the method flow moves to block 820, described below. If the base domain name of the DNS query does not match the domain name for the selected record, the method flow moves to block 806 and the processor 502 determines whether the client identifier for the received DNS query is in the active list. If not, the method flow moves to block 820, described below. If the client identifier is in the active list, the method flow proceeds to block 808 and the processor 502 determines whether the base domain name for the received DNS query is in the dependency list for the selected record. If so, the method flow moves to block 812, described below. If the base domain name is not in the dependency list for the selected record, the method flow moves to block 810 and the processor 502 adds the base domain name to the dependency list for the selected record of the domain name dependency database 506. The method flow proceeds to block 812.

At block 812, the processor 502 adds to a weight value to the selected record of the domain name dependency database 506. The amount that is added is calculated based on the elapsed time between the base domain name query for the selected record and the dependent query for the selected record. At block 814, the processor 502 determines whether the adjusted weight amount is greater than a threshold value, referred to in FIG. 8 as a "confirm-add" threshold. If the adjusted weight is not greater than the confirm-add threshold, the method flow moves to block 818, described below. If the adjusted weight is greater than the confirm-add threshold, the method flow proceeds to block 816 and the processor 502 registers the dependency at the selected record of the domain name dependency database 506 by adding the domain name of the received query to the list of dependencies for the base domain name of the selected record. The method flow proceeds to block 818 where the processor 502 increases the dependency count for the selected record by 1.

At block 820 the processor 502 determines whether all records of the domain name dependency database 506 have been processed. If not, the method flow moves to block 822 and the processor 502 selects the next record of the domain name dependency database 506. The method flow returns to block 804 to process the selected record. Returning to block 820, if the processor 502 determines that all records of the domain name dependency database 506 have been processed, the method flow proceeds to block 822 and the method ends.

In at least one embodiment, the records of the domain name dependency database are periodically reviewed by the processor 502. During the review, the processor 502 determines whether the active period timer (initiated at block 714 of FIG. 7) for each the active client identifier has expired, and removes those clients identifiers from the active clients lists of the records. In addition, for each record for which a client identifier has been removed, the processor 502 deletes those records that have an empty active client lists and an empty dependency list.

In addition, during the review the processor 502 removes from the domain name dependency database 506 those records that have hit counts below a threshold or that have not had their hit counts adjusted for a threshold amount of time. The processor 502 can also remove from the domain name dependency database those records that have empty active client lists and empty dependency lists. Moreover, for each dependency in each record the processor 502 can determine whether the hit count for that dependency since the last review exceeds a threshold. If not, the processor 502 can reduce the weight value for that dependency. Further, the processor 502 can remove a dependency having a weight below a threshold value. The processor 502 thus ensures that the records of the domain name database 506 reflect recently received domain name query activity, thereby improving the reliability and accuracy of the dependencies.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors. In addition to general purpose processors, specialized accelerators which analyze DNS query time sequences to discover dependencies can be employed.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   at a local Domain Name Service (DNS) server, providing a first DNS query for a first domain name to a network for provision to a domain-name dependency server (DDS), wherein the first domain name identifies a webpage;
   in response to providing the first DNS query to the network, receiving from the DDES a first set of domain names used to access content included in the web page and storing the first set of domain names at a cache of the local DNS server, wherein the first set of domain names indicate content in other domains that are different than a domain indicated by the first domain name;
   generating a set of DNS queries at the local DNS server to identify addresses for the first set of domain names;
   determining at the local DNS server a second set of domain names used to access content included in the webpage, wherein
   the second set of domain names indicate content in other domains that are different than the domain indicated by the first domain name, and
   based on DNS queries received from local devices via a local network coupled to the local DNS server, and
   the second set of domain names are determined based on DNS queries received from local devices via a local network coupled to the local DNS server and further based on client identifiers included in the DNS queries;
   merging the second set of domain names with the first set of domain names at the local DNS server to form a third set of domain names wherein generating the set of DNS queries comprises generating the set of DNS queries to identify addresses for the third set of domain names; and
   identifying a time sequence of DNS queries for one of the local devices based on the client identifiers, wherein determining the second set of domain names comprises determining the second set of domain names based on the time sequence of DNS queries.

2. The method of claim 1, further comprising:
   providing from the local DNS server a response to a second DNS query including an address for a domain name of the second DNS query, the second DNS query received from a client device; and
   including with the response an indication that the address is not to be cached at the client device.

3. The method of claim 2, wherein the indication comprises a time-to-live field of the response to the second DNS query.

4. The method of claim 1, wherein the first DNS query comprises a DNS query for a web page.

5. The method of claim 1, wherein the first DNS query comprises a DNS query for streaming media.

6. The method of claim 1, wherein the first DNS query comprises a DNS query for a network messaging service.

7. A local domain name service (DNS) server, comprising:
   a network interface to provide a first DNS query for a first domain name to a network for provision to a domain-name dependency server (DDS), wherein the first domain name identifies a webpage;
   a cache to store a first set of domain names used to indicate content included in the webpage and received in response to the first DNS query, wherein
   the first set of domain names indicate other domains that are different than a domain indicated by the first domain name, and
   the first set of domain names is determined based on DNS queries from multiple devices over a wide area network;
   a processor configured to generate a set of DNS queries at the local DNS server to identify addresses for the first set of domain names, wherein
   the cache is to store a second set of domain names related to the first domain name,
   the processor is to merge the second set of domain names with the first set of domain names at the local DNS server to determine a third set of domain names,
   the processor is to generate the set of DNS queries based on the third set of domain names,
   the processor is to identify a time sequence of DNS queries for one of the local devices based on the client identifiers, and
   the processor is to determine the second set of domain names comprises based on DNS queries received from local devices via a local network, based on client identifiers included in the DNS queries, and based on the time sequence of DNS queries.

8. The local DNS server of claim 7, wherein the processor is to:
   provide a response to a second DNS query including an address for a domain name of the second DNS query, the second DNS query to be received from a client device; and
   include with the response an indication that the address is not to be cached at the client device.

9. The local DNS server of claim 8, wherein the indication comprises a time-to-live field of the response to the second DNS query.

* * * * *